United States Patent [19]

Reyners

[11] 4,347,402
[45] Aug. 31, 1982

[54] CABLE SPLICE ENCLOSURES AND METHOD OF USE

[76] Inventor: Thierry Reyners, Sanchidrian 12, Pozuelo, Madrid 23, Spain

[21] Appl. No.: 142,610

[22] Filed: Apr. 21, 1980

Related U.S. Application Data

[63] Continuation of Ser. No. 79,107, Sep. 26, 1979, abandoned, which is a continuation of Ser. No. 836,411, Sep. 26, 1977, abandoned.

[30] Foreign Application Priority Data

Sep. 28, 1976 [ES] Spain .................................... 223470

[51] Int. Cl.³ .................... H02G 13/06; B21F 15/02; H02G 1/14
[52] U.S. Cl. ........................................ 174/91; 29/868; 156/49; 174/21 R; 174/93; 174/DIG. 8
[58] Field of Search .......................... 156/49, 86, 85; 174/DIG. 8, 84 R, 91, 92, 93, 21 R, 21 JS, 22 R, 22 C; 29/868

[56] References Cited

U.S. PATENT DOCUMENTS

| | | | |
|---|---|---|---|
| 2,978,533 | 4/1961 | Colbert | 174/91 |
| 3,297,819 | 1/1967 | Wetmore | 156/49 |
| 3,518,358 | 6/1970 | Brown | 174/138 |
| 3,663,740 | 5/1972 | Dellett | 174/92 |
| 3,916,086 | 10/1975 | Gillemott et al. | 174/77 |
| 3,983,070 | 9/1976 | Penneck | 156/332 |
| 4,018,733 | 4/1977 | Lopez et al. | 156/327 |
| 4,070,543 | 1/1978 | Thompson | 156/49 |
| 4,117,027 | 9/1978 | Johnson et al. | 260/827 |
| 4,135,743 | 1/1979 | Hughes | 174/DIG. 8 |
| 4,142,592 | 3/1979 | Brusselmans | 174/92 |
| 4,144,404 | 3/1979 | De Groef et al. | 174/84 R |
| 4,179,320 | 12/1979 | Midgley et al. | 156/86 |

FOREIGN PATENT DOCUMENTS

| | | | |
|---|---|---|---|
| 857680 | 12/1977 | Belgium. | |
| 1908996 | 3/1970 | Fed. Rep. of Germany | 174/93 |
| 1941166 | 2/1971 | Fed. Rep. of Germany | 174/93 |
| 1966933 | 6/1975 | Fed. Rep. of Germany. | |
| 2542508 | 3/1977 | Fed. Rep. of Germany. | |
| 2743140 | 6/1978 | Fed. Rep. of Germany | 174/93 |
| 1292476 | 10/1972 | United Kingdom. | |
| 1329611 | 9/1973 | United Kingdom. | |
| 1353752 | 5/1974 | United Kingdom. | |
| 1409674 | 10/1975 | United Kingdom. | |
| 1431167 | 4/1976 | United Kingdom. | |

OTHER PUBLICATIONS

Moisson, U.S. Ser. No. 878,424, filed Feb. 16, 1978.

*Primary Examiner*—William R. Dixon, Jr.
*Attorney, Agent, or Firm*—Lyon & Lyon

[57] ABSTRACT

A casing provides a hermetically sealed enclosure around a joint between two elongate substrates. The casing comprises two generally cylindrical members, each of which comprises a first open end section and second open end section. The first end section includes a heat-shrinkable sealing member which can be shrunk by heat to form a hermetic seal between the first end section and a substrate passing therethrough. The second open end section of each member can be hermetically sealed to the second open end section of the other member. There is a generally cylindrical flexible connecting section between the first and second end sections. This connecting section can be deformed to permit relative axial movement between the first and second open end sections to provide access to the joint.

25 Claims, 4 Drawing Figures

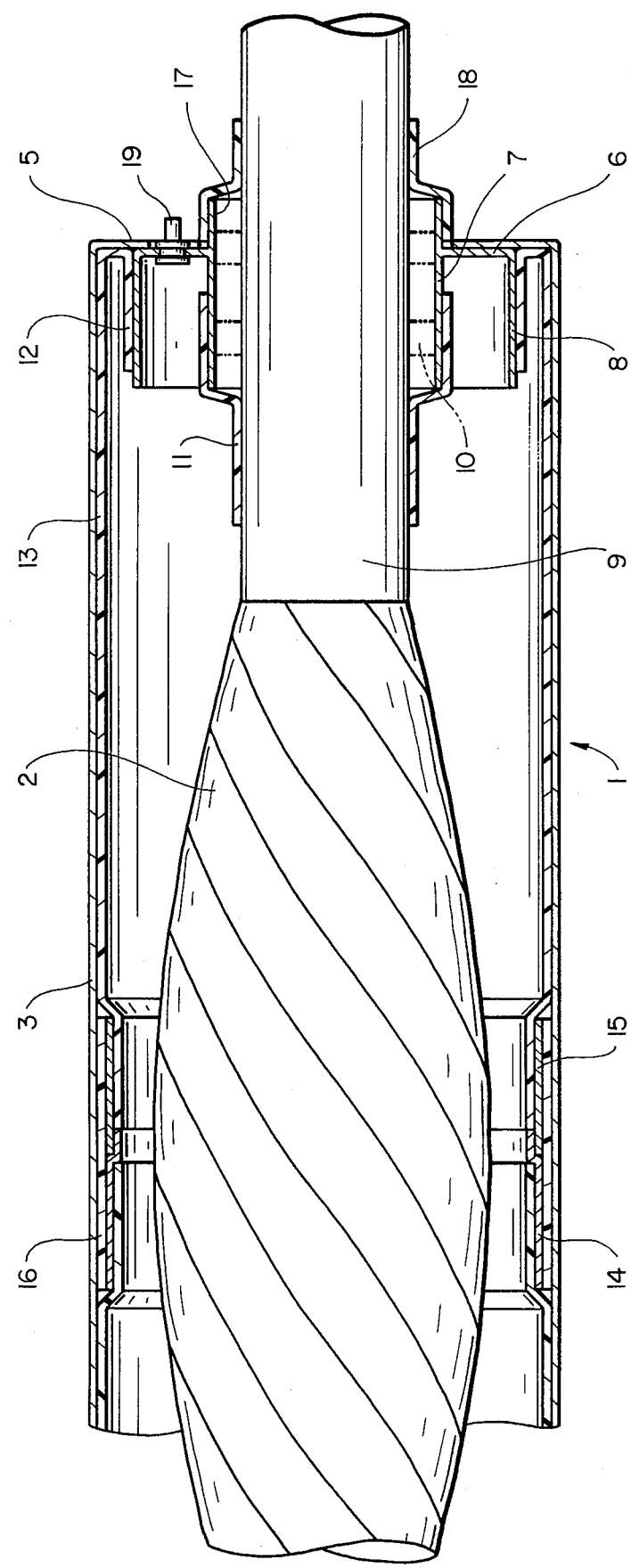
FIG_1

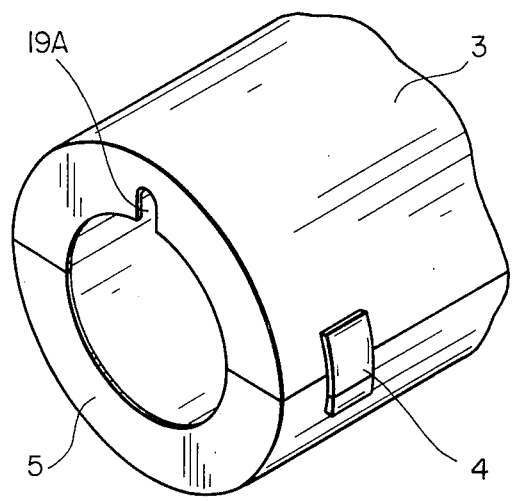
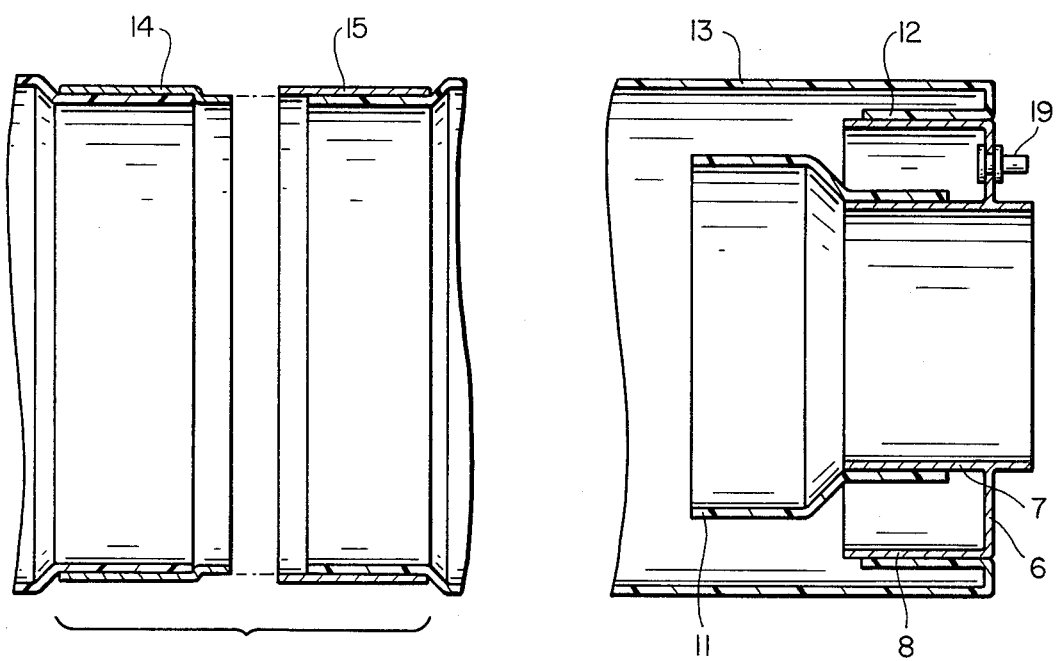

CABLE SPLICE ENCLOSURES AND METHOD OF USE

CROSS-REFERENCES

This application is a continuation of application Ser. No. 79,107, filed Sept. 26, 1979, which is a continuation of application Ser. No. 836,411, filed Sept. 26, 1977, both now abandoned.

This invention relates to apparatus and methods for providing a hollow sealed enclosure around a joint between two elongate substrates. The invention is particularly useful for providing cases around splices in telephone cables, especially pressurized telephone cables, and will be chiefly described in relation to such use. It is to be understood, however, that the invention is useful in relation to elongate substrates in general.

It is known to provide cases around splices in cables by means of a generally cylindrical splice case having a rigid central section and heat-shrinkable sealing sections at each end. Such splice cases suffer from two particularly serious disadvantages. Firstly, because the splice case must be passed over one of the free ends of the cable before any jointing takes place, there must be a sufficient length of cable available for the case to slide up the cable so that it is out of the way while jointing is effected. This is often not so in the restricted space available in a manhole. Secondly; such cases, once they have been sealed, cannot be reentered for repair, maintenance, etc. of the cable splice.

The present invention overcomes these disadvantages by providing a splice case which is split into two parts, each of which can be temporarily shortened in length. Each part is permanently sealed to the cable at one end and sealed, preferably re-enterably sealed, to the other part at the center. The parts can be shortened while the joint is being made and/or when the joint is re-entered.

In one aspect the invention provides apparatus for providing a hollow sealed enclosure around a joint between two elongate substrates, characterized in that the apparatus comprises two generally cylindrical members, each of which members comprises:

(1) A first open end section which comprises a heat-shrinkable sealing member which can be shrunk by heat to form a seal between the end section and a substrate passing therethrough;

(2) A second open end section which can be sealed to the second open end section of the other member; and (3) A generally cylindrical connecting section which is substantially impermeable to air, which connects the first and second open end sections and which can be deformed to permit substantial relative axial movement thereof.

Typically the connecting section is composed of a natural or synthetic rubber, which may for example be smooth-surfaced in the assembled splice and become corrugated or involuted in the shortened configuration.

In one embodiment of the invention, the internal diameter of the second section is greater than the external diameter of the first open end section, and the connecting section is so constructed and arranged that at least part of the second section can be passed over the first section. This of course makes possible a greater shortening of the member than would otherwise be possible. Generally each of the first and second sections comprises a rigid collar, e.g., of metal or an organic polymer, to which the connection section and the heat-shrinkable member are sealed.

The invention also includes a method of making a joint between two elongate substrates and providing a hollow sealed enclosure around the joint, which method is characterized by:

(1) Placing a generally cylindrical member as described above over each of the substrates;

(2) Joining the substrates;

(3) Sealing each of the first open end sections to the substrate by heating the heat-shrinkable member thereof; and (4) Sealing the second open end sections to each other.

To provide yet further integrity of the sealed enclosure, and especially to guard against the external pressure exceeding the pressure inside the enclosure, the first end sections may comprise with an outwardly extending lip or flange which provides a sealing surface for a heat-shrinkable sleeve which is shrunk around the lip and the cable.

Because the connecting sections are deformable, it is desirable that they should be protected from physical damage after assembly, and it may also be desirable to have some means to prevent internal pressure from causing excessive deformation of the connecting sections. It is, therefore, preferred that the apparatus also comprises means for providing a rigid shell round said sections (1), (2) and (3) after they have been used to provide a sealed enclosure, for example a pair of generally hemi-cylindrical members which can be mechanically secured together.

When it is to be used with pressurized cables, the apparatus will generally also comprise a valve for checking and adjusting the internal pressure.

The invention is illustrated in the accompanying drawings which are described in detail in Spanish Utility Model Application No. 223470 from which convention priority is claimed and the entire disclosure of which is hereby incorporated by reference.

FIG. 1 is a longitudinal section through one-half of a splice casing fitted around an end of a spliced cable;

FIG. 2 is a perspective view of one end of the metallic envelope;

FIG. 3 is a longitudinal section through the central zone where the halves of the envelope are joined; and FIG. 4 is a longitudinal section through an end of the casing before it is fitted to the splice.

Referring first to FIG. 1, this shows the general arrangement of one half of a splice casing 1 which encloses in an air-tight manner the area of the splice 2 between the ends of two cables 9, only one end being shown, i.e. the right-hand end. The casing consists of an outer cylindrical envelope 3 which is divided into two halves along an axial plane at which, as shown in FIG. 2, the two halves can be connected and disconnected by means of suitable sealing elements, one of which is illustrated diagrammatically in FIG. 2 and is indicated by the reference numberal 4. The envelope 3 is provided at its ends with radial inwardly directed ribs 5 which, on the outside, are applied to end clips or sealing parts 6 of circular shape; fitted in one of these clips or sealing parts is an inspection valve 19 for checking the presence of pressure for which a supply channel 19' is formed in the end rib 5 of the envelope 3. The inner and outer edges of the ring 6 carry cylindrical ribs or fins (referred to as flanges in the claims) 7 and 8 respectively. Of these ribs or fins (referred to as flanges in the claims), the inner one 7 has an inside diameter which is somewhat greater than the outside diameter of the cable 9 so that it can be fitted thereon with spacing members 10 interposed between the two parts.

The hermetic seal between the inner cylindrical rib 7 and the cable 9 is achieved by means of a heat-shrinkable sleeve 11 which is shrunk by heat on to said rib 7 and that portion of the cable adjacent thereto, a suitable bonding agent being applied in between. As will be readily appreciated, the internal pressure will tend to press the shrunk sleeve 11 more firmly on to said rib 7 and the cable 9, so that the hermetic seal between these parts is rendered durable and efficient.

Secured to the outer surface of each outer cylindrical fin or rib 8, with the aid of a suitable bonding agent, is one end 12 of a bush or sleeve 13 of flexible material which is then folded over so that said end 12 and the rest of the sleeve 13 of flexible material are directed towards the splice zone, the other end 30 of the sleeve extending as far as the mid-way point of said zone as illustrated in FIGS. 3 and 4, a similar sleeve or bush being provided on the other half of the splice. The two ends 12, 30 of each sleeve 13 are connected by a connecting section 32. The two rubber bushes or sleeves 13 associated with each end of the casing and extending to the midway point of the splice zone are each fitted below a metal sleeve or ring 14 and 15 respectively, which sleeves or rings can be connected to each other by any suitable means, for example by reducing the diameter of the end of the sleeve 14 so that it can be introduced into the end of the sleeve as illustrated in FIGS. 1 and 3.

In the operative position of the casing as illustrated in FIG. 1, the sleeve 13 is retained by the outer envelope 3 when pressure is applied to the interior of the casing, and its end 12 is applied more firmly against the rib 8 so that the hermetic seal formed between the sleeve and the rib is improved, i.e. in the same way as with the heat-shrinkable sleeve 11 and the inner rib 7.

As will be seen from FIG. 3, the two sleeves 14 and 15 are of slightly smaller diameter than the rubber sleeve or tube 13, so that a further heat-shrinkable sleeve 16 can be fitted on the sleeves 14 and 15 so as to achieve a hermetic seal between the sleeves 14 and 15, said sleeve 16 having approximately the same outside diameter as each of the sleeves 13 when fitted on them and together with the sleeves 13, the sleeve 16 is thus held against the inner surface of the envelope 3 when the casing is completely fitted; thus there is no possibility of the internal pressure having an adverse effect on the hermetic joint between the two sleeves 14 and 15 and the heat-shrinkable sleeve 16.

When it is required to open the hermetic casing for the purpose of inspecting or repairing the splice, the envelope 3 is withdrawn, then the internal pressure is reduced and the heat-shrinkable seal 16 is cut up and removed so that the sleeves 14 and 15 are displaced in opposite directions by moving them to the rear of the splice, i.e. on to the cables 9, with the sleeves 13 at the same time in the inverted position. When the necessary work has been carried out on the splice, the sleeves 14 and 15 are rejoined by fitting a fresh heat-shrinkable sleeve 16 on them, this latter sleeve being the only element of the casing that becomes damaged. The fresh heat-shrinkable sleeve is fitted in the envelope 3 and when the casing has been brought to the same initial position, the necessary pressure is applied to the interior thereof by way of the valve 12.

Although, the system of hermetic joints that has been described can be regarded as suitable for providing a very reliable casing arrangement, an additional cylindrical rib 17 can be provided in each annular clip or end part 6, which additional part 17 extends outwardly and is positioned opposite the inner rib 7, and a heat-shrinkable sleeve 18 may be fitted on the rib 17, which sleeve 18 establishes a hermetic seal between the rib 17 and the outer face of the cable 9 located outside the casing, so that a reinforced joint is formed.

I claim:

1. A method for obtaining access to an electrical splice in a splice casing containing a splice of electrical cable, the casing comprising:
   (i) an outer cylindrical envelope (3) which extends beyond the splice, the outer cylindrical envelope having a longitudinal gap along an axial plane and comprising means (4) for closing the gap which means are detachable and can be removed;
   (ii) a rigid collar (6) at each end of the envelope (3) between the envelope and one of the cables, the collar comprising an annular interior flange (7) and radially separated therefrom an annular exterior flange (8), wherein at least the interior flange is cylindrical and extends toward the center of the casing;
   (iii) for each collar, a first heat-shrinkable sleeve (11) covered on the inside with a bonding agent, which sleeve is applied to the interior cylindrical flange and to the portion of the cable adjacent thereto so as to form a hermetic seal between the interior flange and the cable;
   (iv) a flexible sleeve (13) which is applied to the inside of the outer envelope, the sleeve comprising two portions, the adjacent inner ends (30) of the two portions being joined together and the other ends being extended and folded over inward at the end of said envelope and applied to the outer surface of the outer flange of its respective collar so as to form a hermetic seal therewith, wherein when a pressurized gas is introduced into the casing, the first heat-shrinkable sleeve and the flexible sleeve tend to press more firmly against the surface to which they apply, so that the hermetic seals formed at each end of the envelope are thus rendered tighter, each portion of the flexible sleeve being capable of being inverted and moved towards its respective collar where it remains in the inverted position;
   (v) two metallic rings (14, 15) connected to each other by their edges in the median zone of the splice, and wherein the adjacent inner ends (30) of the two portions of the flexible sleeve are applied respectively to the surfaces of said rings;
   (vi) a second heat-shrinkable sleeve (16) applied to and adhering to the outer surfaces of the connected rings immediately below the outer envelope, which second heat-shrinkable sleeve establishes a hermetic joint between the rings, the method comprising the steps of:
   (a) removing the outer cylindrical envelope,
   (b) removing the second heat-shrinkable sleeve fitted on the two connected rings,
   (c) separating the two rings, and
   (d) moving each portion of the flexible sleeve towards its respective collar by inverting each portion so as to at least partially uncover the splice.

2. A method of making a joint between two elongate substrates and providing a hollow, hermetically sealed, partially removable enclosure around the joint, which method is characterized by the steps of:
   (a) selecting an apparatus comprising two generally cylindrical, flexible sleeves (13), each flexible sleeve comprising a first open end section (12), a second open end section (30), and a generally cylindrical, flexible, deformable connecting section (32) connecting the first and second open end section;
   (b) placing one of the flexible sleeves over each of the substrates;
   (c) joining the substrates to each other;
   (d) hermetically sealing each of the first open end sections to its respective substrate by heating a heat-shrinkable sleeve; and
   (e) hermetically sealing the second open end sections to each other.

3. A method according to claim 2 characterized in that the substrates are telephone cables.

4. A method according to claim 3 characterized in that the substrates are pressurized telephone cables.

5. Apparatus for providing a hollow, hermetically sealed, partially removable enclosure around a joint between two elongate substrates, the apparatus comprising:
   (a) two generally cylindrical, flexible sleeves (13), each flexible sleeve comprising a first open end section (12), a second open end section (30), and a generally cylindrical, flexible, deformable connecting section (32) connecting the first and second open end sections;
   (b) means (14, 15) for hermetically sealing the second open end section (30) of each flexible sleeve (3) to the second open end section (30) of the other flexible sleeve (3);
   (c) sealing means (6) including a heat-shrinkable sleeve for forming a hermetic seal between the first open end section (12) of each flexible sleeve (13) and such a substrate passing through the first open end section (12);
   wherein the connecting section is sufficiently deformable to permit substantial relative axial movement between the first and second open end sections for partial removal of the enclosure for access to the joint.

6. Apparatus according to claim 5 characterized in that the connecting section (32) is composed of a natural or synthetic elastomer.

7. Apparatus according to claim 5 characterized in that the internal diameter of the second open end section (30) is greater than the external diameter of the first open end section (12), and the connecting section (32) is sufficiently deformable that at least part of the second section can be passed over the first section.

8. Apparatus according to claim 5 in that the sealing means comprises a rigid collar (6).

9. Apparatus according to claim 8 characterized in that the collar (6) comprises an outer flange (8) extending axially inwardly toward the second open end sections, wherein the first end section is sealed to the outer flange and doubles back on itself such that, after the apparatus has been used to provide a sealed enclosure, any super-atmospheric pressure within the enclosure causes the first end section to be pressed against the outer flange.

10. Apparatus according to claim 8 or 9 characterized in that the collar comprises an inner flange (7) extending axially inwardly toward the second open end sections, wherein the heat-shrinkable sleeve (11) is sealed to the outer surface of the inner flange and the substrate within the connecting section so that, after the apparatus has been used to provide a sealed enclosure, any superatmospheric pressure within the sealed enclosure causes the first sleeve (11) to be pressed against the substrate and the inner flange.

11. Apparatus according to claim 10 characterized in that the collar comprises an outwardly extending flange (17) which provides a sealing surface for a second heat-shrinkable sleeve (18) which is shrunk around the outwardly extending flange and a substrate passing through the first open end section.

12. Apparatus according to claim 5 characterized in that it also comprises:
   means (3) for forming a rigid shell around (i) the flexible sleeves, (ii) the means for hermetically sealing, and (iii) the sealing means after they have been used to provide a sealed enclosure.

13. Apparatus according to claim 12 characterized in that said means for forming a rigid shell comprises a pair of generally hemicylindrical members which can be mechanically secured together.

14. Apparatus according to claim 5 characterized in that the means for hermetically sealing comprises a rigid ring (14, 15) for each second open end section.

15. Apparatus according to claim 14 characterized in that the rings comprise mating surfaces which in the sealed position, define an annular space adapted to receive a third heat-shrinkable sleeve (16).

16. Apparatus according to claim 15 characterized in that it further comprises:
   a third heat-shrinkable sealing sleeve (16) which fits into said annular space.

17. Apparatus according to claim 14 including mechanical means (16) for securing the rings to each other.

18. A casing for splices of electric cables comprising:
   (a) an outer cylindrical envelope (3) which extends beyond the splice;
   (b) a rigid collar (6) at each end of the envelope (3) between the envelope and a cable, the collar comprising an annular interior flange (7) and radially separated therefrom an annular exterior flange (8) wherein at least the interior flange is cylindrical and extends toward the center of the casing;
   (c) for each collar, a first heat-shrinkable sleeve (11), covered on the inside with a bonding agent which sleeve is applied to the interior cylindrical flange and to the portion of the cable adjacent thereto so as to form a hermetic seal between the interior flange and the cable; and
   (d) a flexible sleeve (13) which is applied to the inside of the outer envelope, wherein each end (12) of the flexible sleeve is extended and folded over inwards at the respective end of said envelope and is applied to the outer surface of the outer flange of said collar so as to form a hermetic seal therewith, wherein when a pressurized gas is introduced into the casing, the first heat-shrinkable sleeves and the flexible sleeve tend to press more firmly against the surfaces to which they are applied, so that the hermetic seals formed at each end of the envelope are thus rendered tighter.

19. A casing according to claim 18, characterized in that two metallic rings (14, 15) which can be connected to each other by their edges are provided in a median zone of the splice, and in that the flexible sleeve is constituted by two portions, the adjacent inner ends (30) of the two portions being applied respectively to the surfaces of said rings, a second heat-shrinkable sleeve (16) being applied to and adhering to the outer surfaces of the connected rings immediately below the outer envelope, which second heat-shrinkable sleeve establishes a hermetic joint between the rings.

20. A splice casing according to claim 19, characterized in that the outer cylindrical envelope has a longitudinal gap along an axial plane and comprises means (4) for closing the gap, which means are detachable and can be removed, and wherein if the splice suffers damage, and the second heat-shrinkable sleeve fitted on the two connected rings is removed to separate these rings, the inner end of each portion of the flexible sleeve can be inverted and moved toward its other end (12) where it remains in the inverted position so that the splice zone is uncovered without the need for damaging the end seals, it being possible for the case to be resealed by rejoining the rings and applying another heat-shrinkable sleeve to the rejoined rings.

21. A casing according to claim 18 characterized in that each collar has an additional cylindrical flange (17) which extends in the direction opposite to that of the inner cylindrical flange of said collar, to which additional flange is applied and adheres one part of a third heat-shrinkable sleeve (18), the other part of which is applied and adheres to the adjacent outer surface of the cable, thus forming a reinforced joint between the cable and the casing.

22. Apparatus for providing a hermetically sealed casing for a joint between elongate substrates, characterized in that it comprises:
    (a) an outer cylindrical envelope (3) which extends beyond the joint;
    (b) an annular rigid collar (6) at each end of the envelope beyond the joint, each annular collar being located between the envelope and the substrate, each annular collar comprising an annular interior flange (7) and radially separated therefrom an outer flange (8), at least the interior flange being cylindrical and extending towards the joint, each collar including a first heat-shrinkable sleeve (11) which is applied to the interior surface of the internal cylindrical flange and to that portion of the substrate adjacent thereto so as to form a hermetic seal between the internal flange and the substrate; and
    (c) a flexible sleeve (13) on the inside of the outer envelope, which sleeve is folded over inwards at the ends of said envelope and applied to the outer surface of the outer flange of each annular collar so as to form a hermetic seal therewith, the arrangement being such that when a pressurized gas is introduced into the casing, the first heat-shrinkable sleeve and the flexible sleeve tend to press more firmly against the surfaces to which they are applied, so that the hermetic seals are rendered tighter.

23. Apparatus according to claim 22, comprising in addition rigid rings which can be connected to each other, and wherein the flexible sleeve comprises two portions, the adjacent inner ends (30) of the two portions being applied respectively to the inner surface of said rings, and wherein a second sleeve of heat-shrinkable material is applied below the outer envelope to the connected ring, which second heat-shrinkable sleeve establishes a hermetic joint between the rings.

24. Apparatus according to claim 23 characterized in that the outer cylindrical envelope has a longitudinal gap along an axial plane and comprises detachable means (4) for closing the gap, and wherein both portions of the flexible sleeve are sufficiently flexible that the end applied to a ring can be inverted and removed towards its opposite end.

25. Apparatus according to claim 22, characterized in that each annular collar has an additional cylindrical flange (17) which extends in the direction opposite to that of the inner cylindrical flange of said annular collar, to which additional flange is applied a third heat-shrinkable sleeve (18), the other part of which third heat-shrinkable sleeve is applied to the adjacent outer surface of the substrate.

* * * * *